United States Patent
Mizuno (10) Patent No.: US 7,298,202 B2
(45) Date of Patent: Nov. 20, 2007

(54) FSK DEMODULATOR

(75) Inventor: Koutaro Mizuno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 80 days.

(21) Appl. No.: 11/359,479

(22) Filed: Feb. 23, 2006

(65) Prior Publication Data

US 2006/0261883 A1    Nov. 23, 2006

(30) Foreign Application Priority Data

May 20, 2005  (JP)  ............... 2005-148370

(51) Int. Cl.
  *H04L 27/14* (2006.01)
  *H03D 3/00* (2006.01)
(52) U.S. Cl. .................. 329/300; 329/303; 375/334
(58) Field of Classification Search .......... 329/300, 329/303; 375/334
  See application file for complete search history.

(56) References Cited

U.S. PATENT DOCUMENTS 4,388,595 A * 6/1983 Brooks ........................ 329/336
4,472,816 A * 9/1984 Thompson ................... 375/324
4,716,376 A * 12/1987 Daudelin ..................... 329/300
5,781,588 A * 7/1998 Abe et al. .................... 375/334

FOREIGN PATENT DOCUMENTS

| JP | 6-54004 | 2/1994 |
| JP | 7-231338 | 8/1995 |
| JP | 11-298541 | 10/1999 |
| JP | 2001-358786 | 12/2001 |

* cited by examiner

*Primary Examiner*—Joseph Chang
(74) *Attorney, Agent, or Firm*—Nixon Peabody LLP; Donald Studebaker (57) ABSTRACT

An FSK demodulator which outputs an enable signal in response to the detection of a data change point in a detected signal of an amplitude associated with the received frequency of an input FSK signal, outputs an average signal of the detected signal for each predetermined time period, acquires the average signal in response to the enable signal to output as an offset signal an average value of M average signals, and subtracts the offset signal from the detected signal to output the resulting signal.

8 Claims, 6 Drawing Sheets

FSK DEMODULATOR

BACKGROUND OF THE INVENTION

1. Field of the Invention

The present invention relates to an FSK (Frequency Shift Keying) demodulator for demodulating an FSK signal.

2. Description of the Related Background Art

A typical frequency shift keying demodulator (hereinafter referred to as an FSK demodulator), which is used in wireless communication receivers, receives an input FSK signal to acquire, as data, a detected signal of an amplitude associated with the received frequency. The FSK demodulator then compares the amplitude of the detected signal with a threshold value to make an evaluation of the data. A data error may occur at the FSK demodulator due to the effect of noise produced when the detected signal is acquired or due to an offset caused by a frequency error at a local oscillator that is included in a transmitter or receiver.

To suppress the noise effect produced when a detected signal is acquired, a method is available for performing demodulations without using a signal around the zero cross point that is susceptible to noise (e.g., see Japanese Patent Application Kokai No. Hei 6-54004.)

In some methods typically available for removing offsets, a detected signal is introduced into an integrator to acquire the average of amplitude values of the detected signal, which is in turn determined as the quantity of offset.

Another method for removing offsets is also disclosed, for example, in Japanese Patent Application Kokai No. Hei 7-231338 in which a sign evaluation point is set past the center of a symbol period. Still another method for removing offsets is disclosed, for example, in Japanese Patent Application Kokai No. 2001-358786 in which upon acquirement of a detected signal, a cycle is determined on the basis of the intersection between the time axis and the sampled value of an FSK signal waveform to compute the frequency from the cycle. A further method for removing offsets is also disclosed in Japanese Patent Application kokai No. Hei 11-298541 in which a sample value of the detected signal at the zero cross point is subtracted from the detected signal.

According to the method for determining the average value of a detected signal as the quantity of offset, a system in which "0" and "1" equally appear in data provides a stable average value between "0" and "1." However, in a system in which "0" and "1" do not equally appear, the output from the integrator, i.e., the quantity of offset may vary depending on the data pattern, thereby causing the offset not to be properly removed.

SUMMARY OF THE INVENTION

The present invention was developed in view of the aforementioned problems. It is therefore an object of the present invention to provide an FSK demodulator which can properly remove an offset component even from a data pattern in which "0" and "1" do not equally appear in data.

An FSK demodulator according to the present invention comprises: a frequency detection unit which outputs a detected signal of an amplitude associated with a received frequency in response to an input FSK signal; and an offset removal unit which removes an offset component from the detected signal, wherein the offset removal unit includes: a data change point detection unit which outputs an enable signal in response to a detection of a data change point in the detected signal; a first averaging circuit which outputs an average signal of the detected signal for each predetermined time period; an M-time-averaging circuit which acquires the average signal in response to the enable signal, and outputs as an offset signal an average value of M average signals (M is a positive integer); and an offset subtractor circuit which subtracts the offset signal from the detected signal to output a resulting signal as an output signal of the offset removal unit.

An FSK demodulator according to the present invention comprises: a frequency detection unit which outputs a detected signal of an amplitude associated with a received frequency in response to an input FSK signal; and an offset removal unit which removes an offset component from the detected signal, wherein the offset removal unit includes: a delay circuit which delays the detected signal by the predetermined time period to output a delayed signal; a delayed signal subtractor circuit which outputs as a differential signal a difference between the detected signal and the delayed signal; a comparator circuit which outputs a data change point detection signal when an absolute value of the differential signal exceeds a pre-set threshold value; and an N-sample delay circuit which delays the data change point detection signal by an N-sample period (N is a positive integer) to output a resulting delayed signal as the enable signal; a two-value averaging circuit which averages the detected signal and the delayed signal to output a resulting average value as the average signal; an M-time-averaging circuit which acquires the average signal in response to the enable signal, and outputs as an offset signal an average value of M average signals (M is a positive integer); and an offset subtractor circuit which subtracts the offset signal from the detected signal to output a resulting signal as an output signal of the offset removal unit.

Each of the FSK demodulators according to the present invention detects a data change point at which the detected signal changes from "0" to "1" or from "1" to "0," thereby determining an offset value. It is thus possible to remove an offset component properly even from a data pattern in which "0" and "1" do not equally appear. Additionally, the offset value is determined based on an average amplitude value during a predetermined time period such as a one-symbol period in which the data change point is contained, thereby making it possible to reduce the effect of variations in amplitude at the data change point.

DETAILED DESCRIPTION OF THE INVENTION

Embodiments of the present invention will be described below in more detail with reference to the accompanying drawings.

Figure 1:
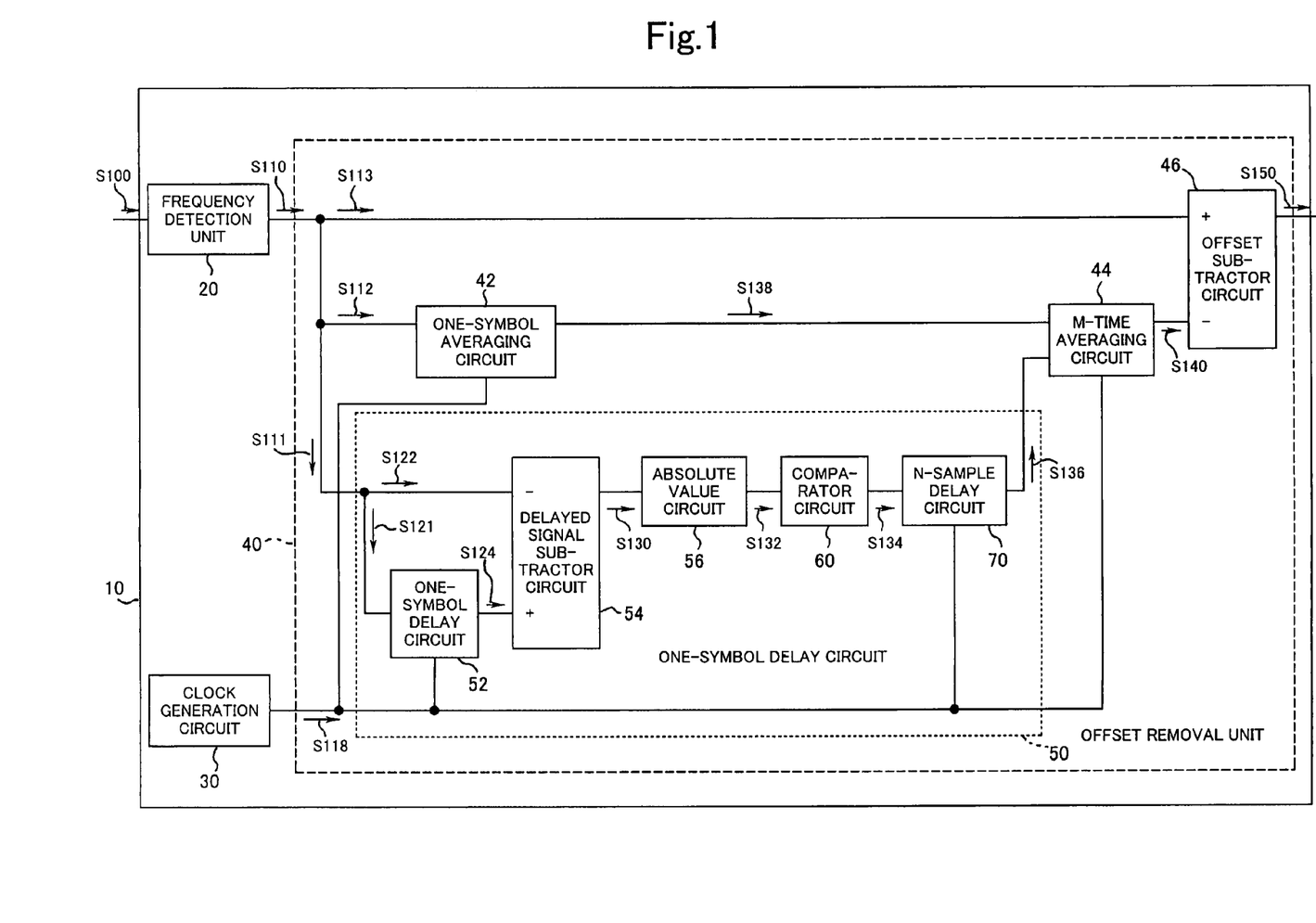
FIG. 1 is a block diagram showing an FSK demodulator according to the present invention.
Figure 2:
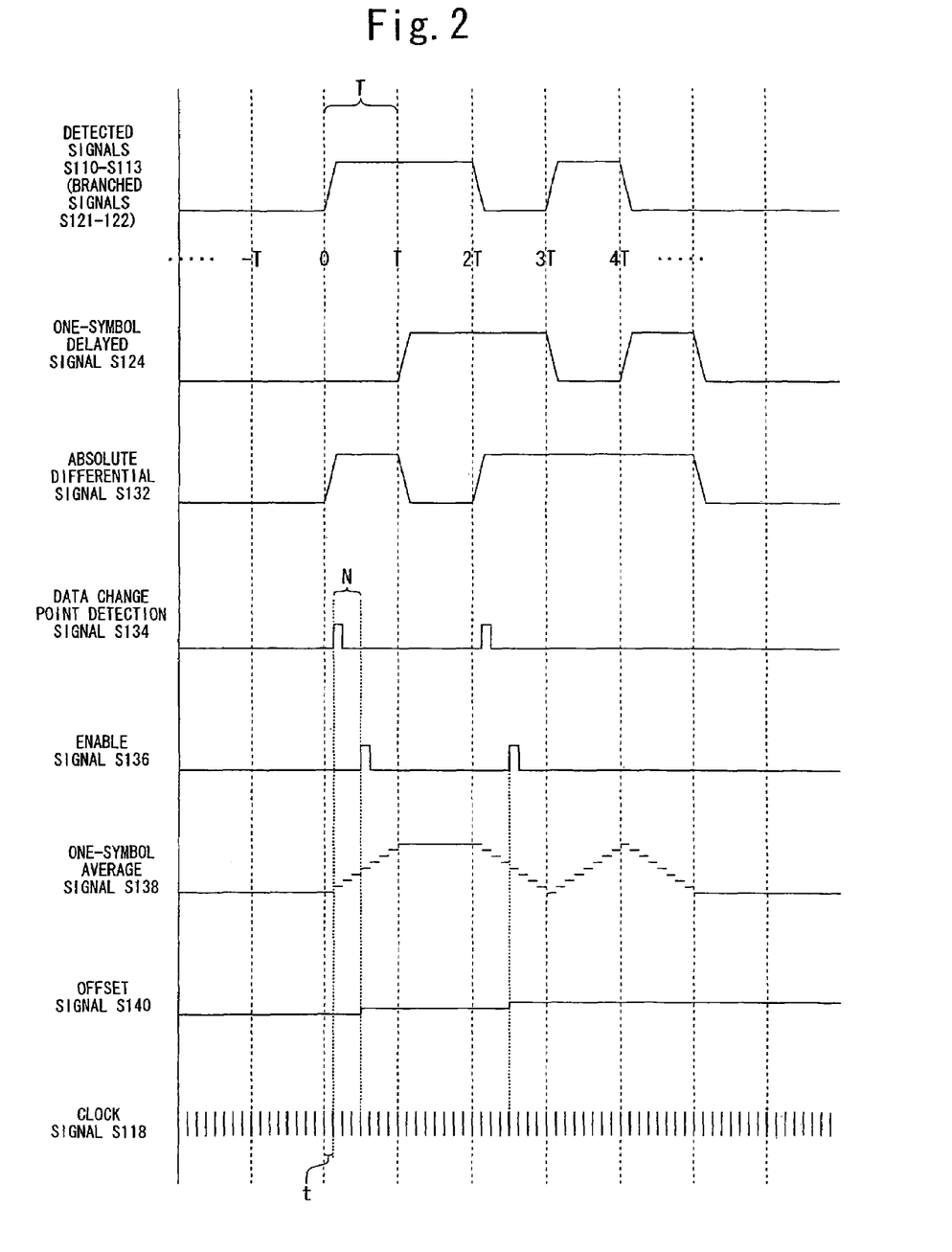
FIG. 2 is an explanatory signal waveform diagram showing the operation of the FSK demodulator of FIG. 1.

FIG. 1 shows the configuration of an FSK demodulator according to the present invention. FIG. 2 shows a signal waveform at each portion of the FSK demodulator of FIG. 1. The FSK demodulator 10 shown in FIG. 1 includes a frequency detection unit 20 and an offset removal unit 40, which are connected in series. The frequency detection unit 20 is supplied with an FSK signal S100 and outputs a detected signal S110. The detected signal S110 output from the frequency detection unit 20 is input to the offset removal unit 40 which removes an offset from the detected signal S110 to output a signal S150. The frequency detection unit 20 outputs the detected signal S110 of an amplitude associated with the received frequency in response to the input FSK signal S100, and can be any known suitable circuit that is typically used with FSK demodulators.

The offset removal unit 40 also includes a data change point detection unit 50, a one-symbol averaging circuit 42, an M-time-averaging circuit 44, and an offset subtractor circuit 46. The detected signal S110 supplied to the offset removal unit 40 is branched into first, second, and third detected signals S111 to S113. The first detected signal S111 is input to the data change point detection unit 50, the second detected signal S112 is input to the one-symbol averaging circuit 42, and the third detected signal S113 is input to the offset subtractor circuit 46.

The data change point detection unit 50 includes a one-symbol delay circuit 52, a delayed signal subtractor circuit 54, an absolute value circuit 56, a comparator circuit 60, and an N-sample delay circuit 70. The first detected signal S111 input to the data change point detection unit 50 is branched into a first branched signal S121 and a second branched signal S122. The first branched signal S121 is input to the one-symbol delay circuit 52, while the second branched signal S122 is input to the delayed signal subtractor circuit 54.

The detected signal S110 is branched into the first to third detected signals S111 to S113, and the first detected signal S111 is branched into the first and second branched signals S121 and S122, as described above. If these signals are voltage signals, all the signals can have the same voltage level.

The one-symbol averaging circuit 42, the M-time-averaging circuit 44, the one-symbol delay circuit 52, and the N-sample delay circuit 70 are provided with a common clock signal S118 generated in a clock generation circuit 30. The clock signal S118 may also be externally input to the FSK demodulator 10, in which case the clock generation circuit 30 may not need to be included in the FSK demodulator 10. Although the pattern of the clock signal S118 is not explicitly indicated in FIG. 2, the clock signal S118 has one clock cycle of t(s).

The one-symbol delay circuit 52 delays the input first branched signal S121 by a one-symbol period T(s) to output the resulting signal as a one-symbol delayed signal S124. Here, the one-symbol period T(s) (which corresponds to a predetermined time period) is a fundamental unit period of data, and the detected signal S110 contains data "1" or "0" in each one-symbol time period. The one-symbol delay circuit 52 can be any known suitable circuit. The one-symbol delayed signal S124 output from the one-symbol delay circuit 52 is input to the delayed signal subtractor circuit 54.

The delayed signal subtractor circuit 54 outputs, as a differential signal S130, the difference between the second branched signal S122 and the one-symbol delayed signal S124 which are input thereto respectively. Since the one-symbol delayed signal S124 has been delayed by a one-symbol period relative to the first detected signal S111, the differential signal S130 indicates the difference in the detected signal between two points separated from each other by a one-symbol period T(s). The differential signal S130 is converted into an absolute value, at the absolute value circuit 56, to be input to the comparator circuit 60 as an absolute differential signal S132. The delayed signal subtractor circuit 54 can be any known suitable differential circuit. The absolute value circuit 56 can also be any known suitable circuit.

Figure 3:
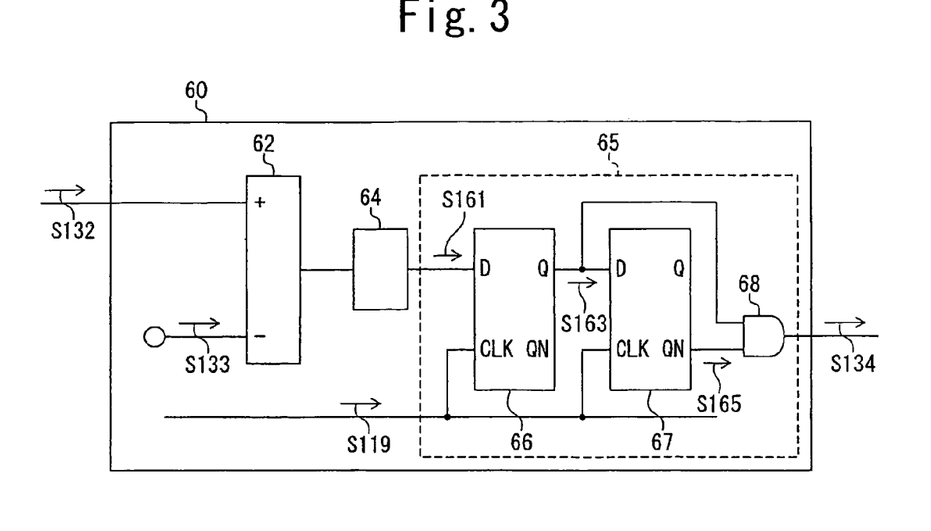
FIG. 3 is a block diagram showing an exemplary configuration of a comparator circuit within the FSK demodulator of FIG. 1.

The comparator circuit 60 outputs a pulsed data change point detection signal S134 when an absolute value of the differential signal or the absolute differential signal S132 has exceeded a pre-set threshold value. Referring now to FIG. 3, an exemplary configuration of the comparator circuit 60 will be described.

The comparator circuit 60 includes a differential circuit 62, a sign extractor circuit 64, a first D flip-flop 66, a second D flip-flop 67, and an AND circuit 68. In response to the input absolute differential signal S132 and a signal indicative of the threshold value S133 (hereinafter also referred to as the threshold signal), the differential circuit 62 subtracts the threshold signal S133 from the absolute differential signal S132. The first D flip-flop 66 and the second D flip-flop 67 are supplied with a common clock signal S119. As the clock signal S119, the clock signal S118 input to the one-symbol averaging circuit 42 or the like may be shared. Alternatively, the clock signal S119 may be separately generated or acquired externally.

Figure 4:
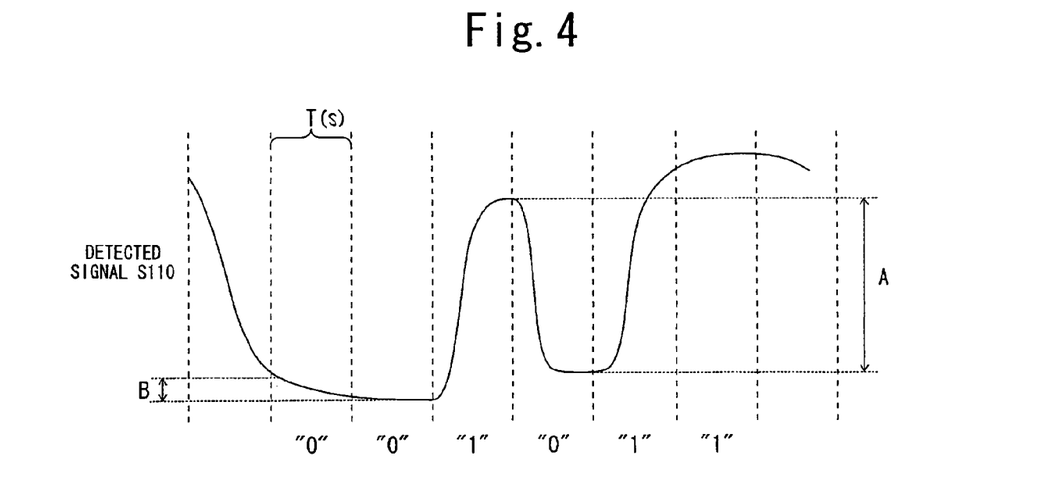
FIG. 4 is an explanatory view showing how to set a threshold value.

Referring now to FIG. 4, a description will be given to how to set a threshold value. FIG. 4 is an explanatory view showing how to set a threshold value, in which the detected signal S110 is indicated with the horizontal axis representing time and the vertical axis representing the amplitude value. At a point at which the data indicated by the detected signal S110 changes from "1" to "0" or from "0" to "1", the difference in the amplitude of the detected signal S110 between two points spaced apart from each other by a one-symbol period T(s) takes on a certain value "A" or greater. On the other hand, when the same data continues, i.e., no change exists in the data, the difference in the amplitude of the detected signal S110 between two points spaced apart from each other by a one-symbol period T(s) takes on a certain value "B" or greater. Here, "B" is less than "A." In this embodiment, the detected signal S110 or the absolute differential signal S132 is observed on an oscilloscope to set as the threshold value a value between "A" and "B."

The signal resulting from a subtraction at the differential circuit 62 is input to the sign extractor circuit 64, where the sign of the subtracted signal is evaluated. If the sign is positive, i.e., the subtracted signal is greater than the threshold value, the sign extractor circuit 64 outputs a signal at a high potential level (H). If the subtracted signal is less than or equal to the threshold value, the sign extractor circuit 64 outputs a signal at a low potential level (L).

Figure 5:
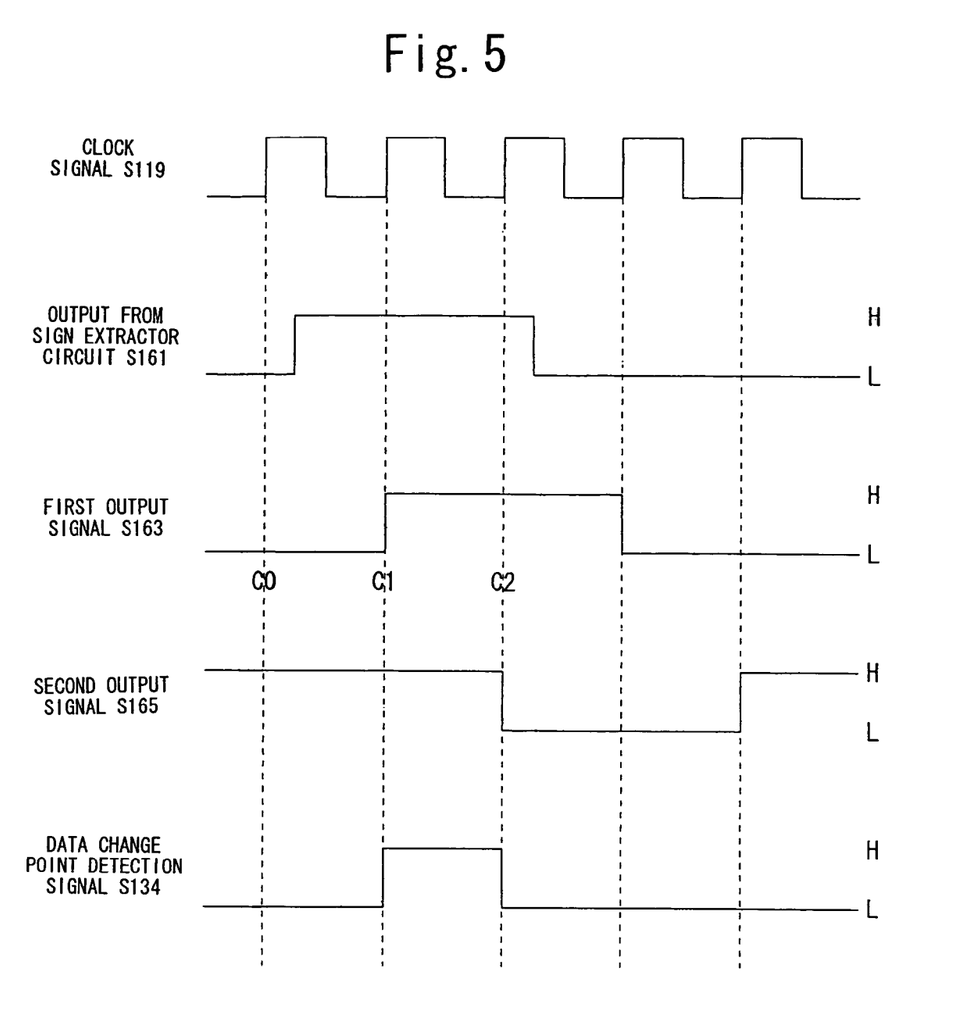
FIG. 5 is an explanatory signal waveform diagram showing the operation of an edge detection circuit within the comparator circuit of FIG. 3.

The first D flip-flop 66, the second D flip-flop 67, and the AND circuit 68 constitute an edge detection circuit 65. Referring now to FIG. 5, a description will be given of the operation of the edge detection circuit 65. FIG. 5 is an explanatory time chart showing how the edge detection circuit 65 operates.

It is assumed that an output S161 from the sign extractor circuit 64 has a low initial potential level (see a time point C0 in FIG. 5). The first D flip-flop 66 outputs a first output signal S163 at the low level through a Q terminal. The first output signal S163 is branched into one signal which is input to the second D flip-flop 67 and the other signal which is input to the AND circuit 68. The second D flip-flop 67, to which the one signal branched from the first output signal S163 has been input, outputs a second output signal S165 at a high level through a QN terminal. Since the first output signal S163 is at the low level and the second output signal S165 is at the high level, the output from the AND circuit 68 or the data change point detection signal S134 is at the low level.

Here, suppose that the output S161 from the sign extractor circuit 64 has changed to the high potential level. In this case, the first output signal S163 output from the first D flip-flop 66 changes to the high level in sync with the rising edge (at a time point C1 in FIG. 5) of a pulse of the clock signal S119 (hereinafter referred to as the clock pulse). The second output signal S165 output from the second D flip-flop 67 continues to output a signal at the high level until the subsequent clock pulse rises (at a time point C2 in FIG. 5). Thus, during the period from the time point C0 to the time point C1, both the first output signal S163 and the second output signal S165 output a signal at the high level, thereby causing the AND circuit 68 to output a signal at the high level. At the time point C2, the second output signal S165 output through the QN terminal of the second D flip-flop 67 is at the low level, thereby causing the AND circuit 68 to output a signal at the low level.

Thus, the comparator circuit 60 outputs the pulsed data change point detection signal S134 having a width of one clock cycle when the absolute value of the differential signal S130 has exceeded the threshold value.

The N-sample delay circuit 70 outputs, as an enable signal S136, a delayed signal obtained by delaying the data change point detection signal S134 by a pre-set N-sample period (N is a positive integer). Here, the sample period is a time interval at which the detected signal is sampled. One sample period t(s) corresponds to one clock cycle of the clock signal S118 input to the N-sample delay circuit 70.

A delay time provided by the N-sample delay circuit 70 is set by observing the detected signal S110 and the enable signal S136 on an oscilloscope or the like such that the enable signal S136 rises at an ideal data change point. A more detailed description will be given later on how to set the delay time.

The one-symbol averaging circuit 42 outputs, as a one-symbol average signal S138, an average amplitude value of the second detected signal S112 for each one-symbol period. Assuming that the one-symbol period is T(s) and one sample period is t(s), the one-symbol average signal S138 outputs the average value of the second detected signal S112 during a one-symbol period T(s) at intervals of the one sample period t(s). Accordingly, the one-symbol averaging circuit 42 outputs an average value of the detected signal S110 from a time point 0 to a time point T during the time from the time point T to a time point T+t, and an average value of the detected signal S110 from the time point t to the time point T+t during the time from the T+t to a time point T+2t. Similarly, during the time from a time point aT+bt to a time point aT+(b+1)t, the one-symbol averaging circuit 42 out-puts an average value of the detected signal S110 from a time point (a−1)T+bt to the time point aT+bt. Here, "a" and "b" are an integer.

The M-time-averaging circuit 44, which is connected to the output portions of the one-symbol averaging circuit 42 and the N-sample delay circuit 70 in the data change point detection unit 50, acquires the one-symbol average signal S138 in response to the reception of the enable signal S136 output from the N-sample delay circuit 70. The M-time-averaging circuit 44 outputs, as an offset signal S140, a pre-set M-time average value (M is a positive integer) of the acquired one-symbol average signal S138. The offset signal S140 output from the M-time-averaging circuit 44 is input to the offset subtractor circuit 46. Here, M is determined in accordance with the response speed required of the demodulator to remove a frequency offset. The larger the M, the lower the response speed becomes. However, a variation in offset value caused by noise or the like will be reduced and thus stabilized. On the other hand, the smaller the M, the greater the variation in offset value caused by noise or the like becomes. However, the response speed is increased.

The value of M also depends on the preamble data pattern. However, for example, when the preamble data pattern has a repetition of "1010," the value of M is desirably less than or equal to the number of symbols that corresponds to a half of the data pattern. For example, to acquire an offset value within 24 symbols, M may be one third of 24, i.e., 8.

Figure 6A:
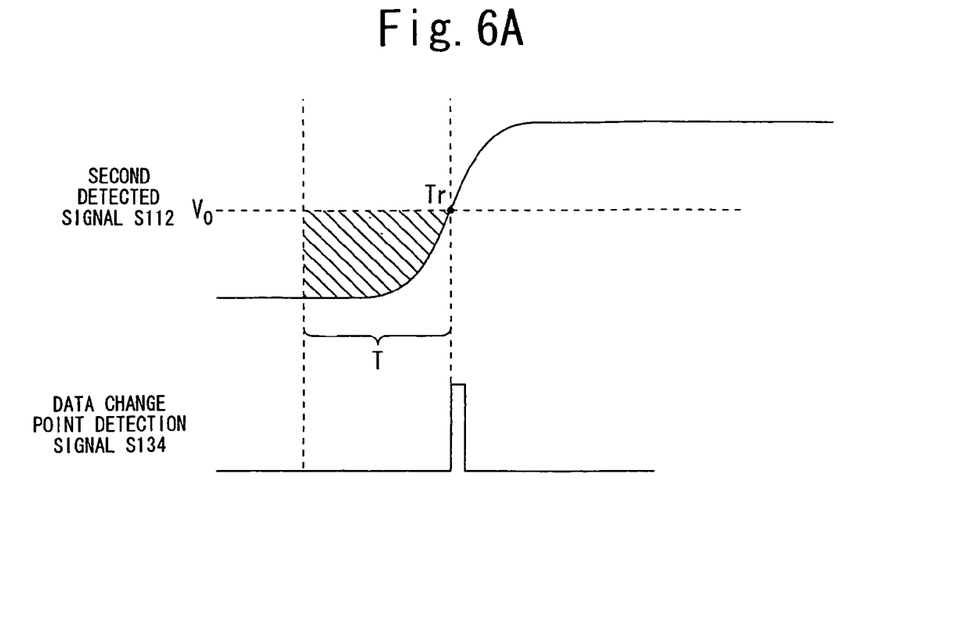
FIGS. 6A and 6B are explanatory signal waveform diagrams showing how to set a delay time in an N-sample delay circuit.

Referring now to FIGS. 6A and 6B, a description will be given with reference to how to provide a delay time setting to the N-sample delay circuit 70. FIG. 6A shows the second branched signal S122 and the data change point detection signal S134, for example, where the enable signal S136 rises at a non-ideal time. As illustrated in FIG. 6A, the horizontal axis represents time, while the vertical axis represents the amplitude value for the second detected signal S112 and the potential level for the data change point detection signal. Additionally, the data change point detection signal S134 is not delayed but used as an enable signal.

When the data change point detection signal S134 serving as an enable signal is input to the M-time-averaging circuit 44, the one-symbol average signal S138 then available is acquired by the M-time-averaging circuit 44. Assuming that Tr is a point in time at which the second detected signal S112 intersects an offset value Vo, the M-time-averaging circuit 44 is supplied with an average value from a time point Tr−T to the time point Tr, thereby causing the value of the offset signal to be less than the original offset value Vo.

Figure 6B:
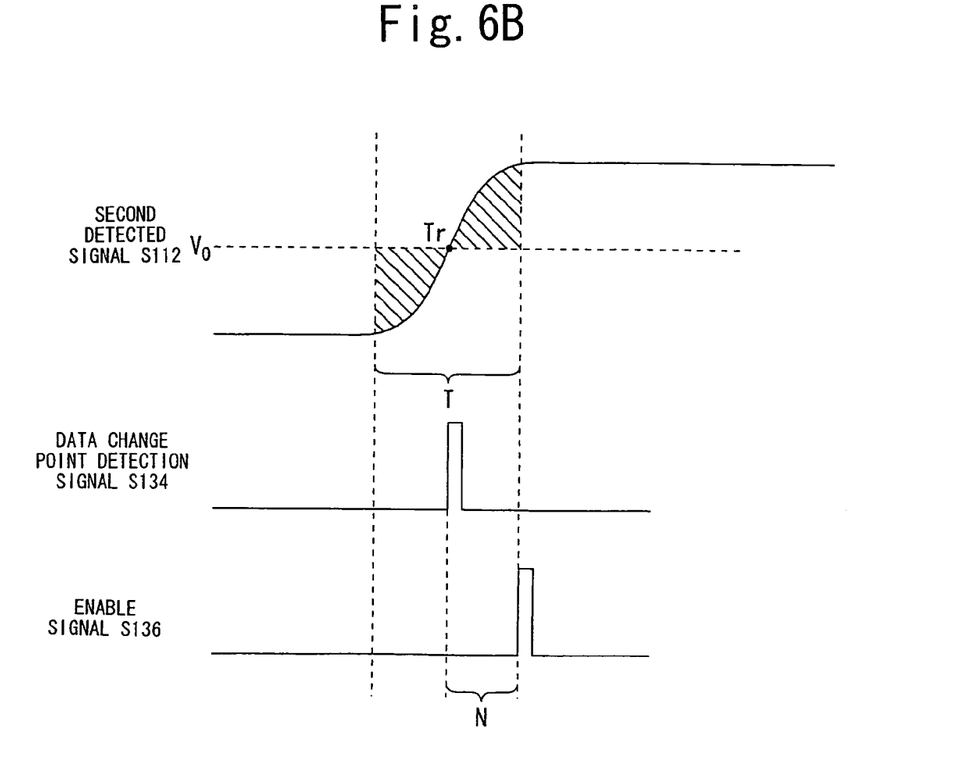

FIG. 6B shows the second detected signal S112, the data change point detection signal S134, and the enable signal S136, for example, where the enable signal rises at an ideal time. As illustrated in FIG. 6B, the horizontal axis represents time, while the vertical axis represents the amplitude value for the second detected signal S112 and the potential level for the data change point detection signal S134 and the enable signal S136. Additionally, the data change point detection signal S134 is delayed by N samples. When the enable signal S136 delayed by N samples is input to the M-time-averaging circuit 44 at a time point Tr+T/2, the M-time-averaging circuit 44 receives, as the one-symbol average signal S138, an average value from a time point Tr−T/2 to the time point Tr+T/2. Accordingly, the value of the offset signal S140 becomes equal to the original offset value Vo.

The offset subtractor circuit 46 is supplied with the third detected signal S113 and the offset signal S140, while the offset subtractor circuit 46 subtracts the offset signal S140 from the input third detected signal S113 to output the resulting signal as the output signal S150.

The FSK demodulator shown in FIG. 1 detects a data change point at which data (detected signal) changes from "0" to "1" or from "1" to "0" to determine an offset value, thereby making it possible to remove an offset component properly, even from a data pattern in which "0" and "1" do not equally appear in data. Furthermore, the FSK demodulator determines an offset value based on the average amplitude value for a one-symbol time period including a data change point, thereby making it possible to reduce the effect of variations in amplitude at the data change point.

Figure 7:
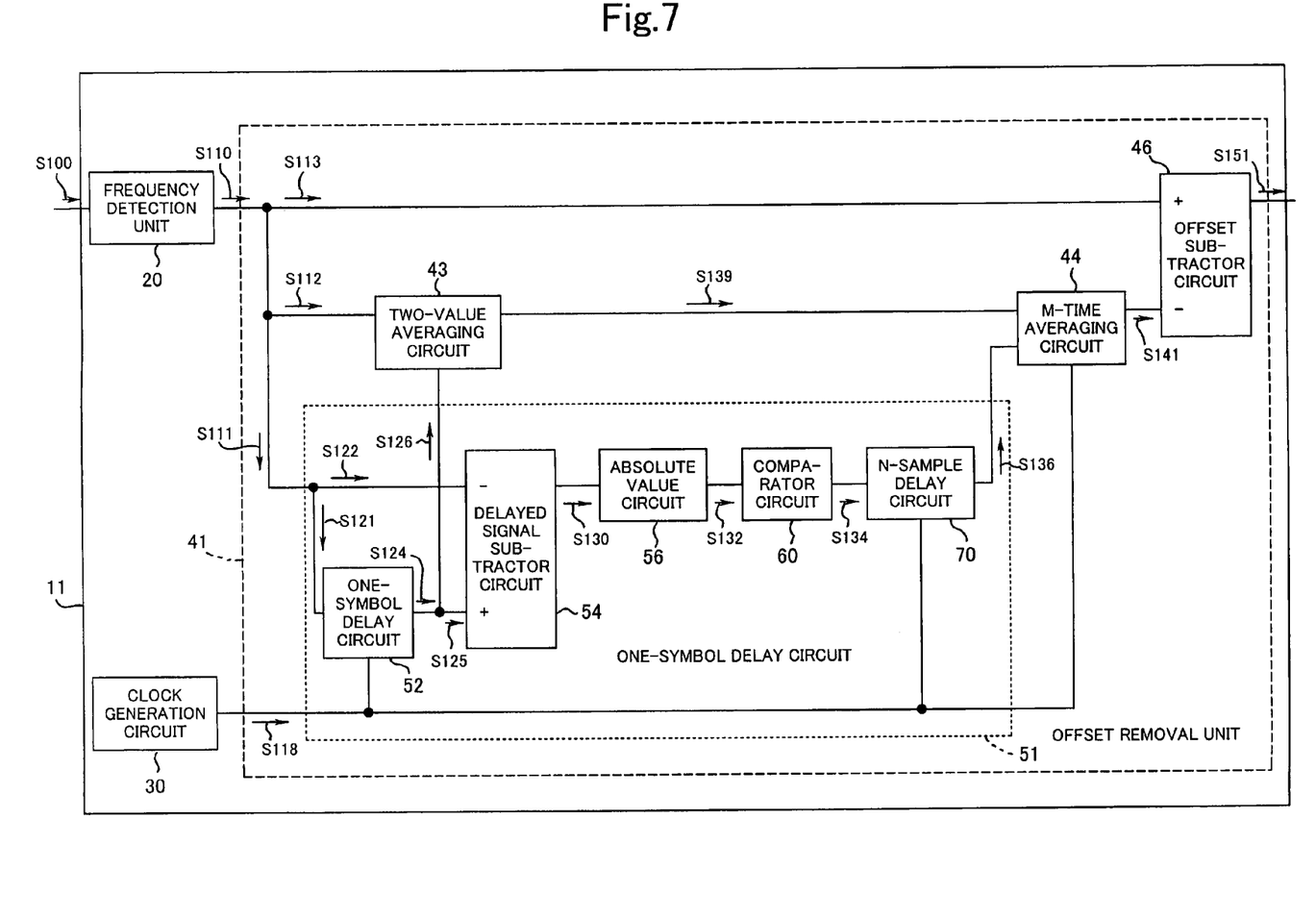
FIG. 7 is a block diagram showing another FSK demodulator according to the present invention.

FIG. 7 also shows the configuration of another FSK demodulator according to the present invention. The FSK demodulator 11 shown in FIG. 7 includes a frequency detection unit 20 and an offset removal unit 40, which are connected in series. The frequency detection unit 20 is supplied with an FSK signal S100. A detected signal S110 output from the frequency detection unit 20 is input to an offset removal unit 41 which removes an offset from the detected signal S110 to output a signal S151. The frequency detection unit 20 outputs the detected signal S110 of an amplitude associated with the received frequency in response to the input FSK signal S100, and can be any suitable well-known circuit that is used with FSK demodulators.

The offset removal unit 41 also includes a data change point detection unit 51, a two-value averaging circuit 43, an M-time-averaging circuit 44, and an offset subtractor circuit 46. The detected signal S110 input to the offset removal unit 41 is branched into first to third detected signals S111 to S113. The first detected signal S111 is input to the data change point detection unit 51, the second detected signal S112 is input to the two-value averaging circuit 43, and the third detected signal S113 is input to the offset subtractor circuit 46.

Similar to the FSK demodulator of FIG. 1, the data change point detection unit 51 includes a one-symbol delay circuit 52, a delayed signal subtractor circuit 54, an absolute value circuit 56, a comparator circuit 60, and an N-sample delay circuit 70. The FSK demodulator of this embodiment is different from the FSK demodulator of FIG. 1 in the following points. That is, a one-symbol delayed signal S124 output from the one-symbol delay circuit 52 is branched into a first delayed signal S125 and a second delayed signal S126. The first delayed signal S125 is input to the delayed signal subtractor circuit 54, while the second delayed signal S126 is input to the two-value averaging circuit 43. The other arrangements are the same as those of the FSK demodulator of FIG. 1 and thus will not be discussed here in detail.

The two-value averaging circuit 43 outputs an average value of the second detected signal S112 and the second delayed signal S126, as a two-value average signal S139.

The M-time-averaging circuit 44, which is connected to the output portions of the two-value averaging circuit 43 and the N-sample delay circuit 70 in the data change point detection unit 51, acquires the two-value average signal S139 in response to the reception of an enable signal S136 output from the N-sample delay circuit 70. The M-time-averaging circuit 44 outputs, as an offset signal S141, an M-time average value (M is a positive integer) of the acquired two-value average signal S139. The offset signal S141 output from the M-time-averaging circuit 44 is input to the offset subtractor circuit 46.

The offset subtractor circuit 46 is supplied with the third detected signal S113 and the offset signal S141. The offset subtractor circuit 46 subtracts the offset signal S141 from the input third detected signal S113 to output the resulting signal as the output signal S151.

The FSK demodulator of FIG. 7 detects a data change point at which data changes from "0" to "1" or from "1" to "0", and then based on the data change point, determines as an offset value the average value of the detected signal at two points spaced apart from each other by a one-symbol period T(s). Accordingly, this makes it possible to remove an offset component properly even from a data pattern in which "0" and "1" do not equally appear in data. It is also possible to reduce variations in amplitude at the data change point.

The one-symbol averaging circuit included in the FSK demodulator of FIG. 1 requires a shift register that has the number of storage areas that corresponds to the number of samples in a one-symbol period T(s). In contrast to this, the FSK demodulator of FIG. 7 employs the two-value averaging circuit 43 instead of the one-symbol averaging circuit 42. The two-value averaging circuit 43 has to include only a function of outputting the average of two points, thereby making it possible to reduce the circuit scale.

What is claimed is:

1. An FSK demodulator comprising:
   a frequency detection unit which outputs a detected signal of an amplitude associated with a received frequency in response to an input FSK signal; and
   an offset removal unit which removes an offset component from the detected signal,
   wherein said offset removal unit includes:
   a data change point detection unit which outputs an enable signal in response to a detection of a data change point in the detected signal;
   a first averaging circuit which outputs an average signal of the detected signal for each predetermined time period;
   an M-time-averaging circuit which acquires the average signal in response to the enable signal, and outputs as an offset signal an average value of M average signals (M is a positive integer); and
   an offset subtractor circuit which subtracts the offset signal from the detected signal to output a resulting signal as an output signal of said offset removal unit.

2. The FSK demodulator according to claim 1, wherein said first averaging circuit outputs, as the average signal, an average amplitude value of the detected signal for each predetermined time period.

3. The FSK demodulator according to claim 1, wherein said first averaging circuit includes:
   predetermined time period to output a delayed signal; and
   a two-value averaging circuit which averages the detected signal and the delayed signal to output a resulting average value as the average signal.

4. The FSK demodulator according to claim 1, wherein said data change point detection unit includes:
   a delay circuit which delays the detected signal by the predetermined time period to output a resulting delayed signal;
   a delayed signal subtractor circuit which outputs, as a differential signal, a difference between the detected signal and the delayed signal;
   a comparator circuit which outputs a data change point detection signal when an absolute value of the differential signal exceeds a pre-set threshold value; and
   an N-sample delay circuit which delays the data change point detection signal by an N-sample period (N is a positive integer) to output a resulting delayed signal as the enable signal.

5. The FSK demodulator according to claim 4, wherein said comparator circuit includes:
- a differential circuit which subtracts the threshold value from the absolute value of the differential signal to output a resulting signal;
- a sign extractor circuit which extracts a sign of the output signal of said differential circuit; and
- an edge detection circuit which detects a time point when the sign of the output signal of said differential circuit changes from a negative state to a positive state in sync with a clock signal to output the data change point detection signal during one cycle of the clock signal from the time point.

6. The FSK demodulator according to claim 1, wherein the predetermined time period is a one-symbol time period corresponding to a fundamental unit period of the detected signal.

7. An FSK demodulator comprising:
- a frequency detection unit which outputs a detected signal of an amplitude associated with a received frequency in response to an input FSK signal; and
- an offset removal unit which removes an offset component from the detected signal,
- wherein said offset removal unit includes:
- a delay circuit which delays the detected signal by the predetermined time period to output a delayed signal;
- a delayed signal subtractor circuit which outputs as a differential signal a difference between the detected signal and the delayed signal;
- a comparator circuit which outputs a data change point detection signal when an absolute value of the differential signal exceeds a pre-set threshold value; and
- an N-sample delay circuit which delays the data change point detection signal by an N-sample period (N is a positive integer) to output a resulting delayed signal as the enable signal;
- a two-value averaging circuit which averages the detected signal and the delayed signal to output a resulting average value as the average signal;
- an M-time-averaging circuit which acquires the average signal in response to the enable signal, and outputs as an offset signal an average value of M average signals (M is a positive integer); and
- an offset subtractor circuit which subtracts the offset signal from the detected signal to output a resulting signal as an output signal of said offset removal unit.

8. The FSK demodulator according to claim 7, wherein the predetermined time period is a one-symbol time period corresponding to a fundamental unit period of the detected signal.

* * * * *